United States Patent
Farhan et al.

(10) Patent No.: US 6,771,909 B2
(45) Date of Patent: *Aug. 3, 2004

(54) DIGITAL OPTICAL TRANSMITTER

(75) Inventors: Forrest M. Farhan, Duluth, GA (US); Alberto P. Gaibazzi, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/273,240

(22) Filed: Oct. 17, 2002

(65) Prior Publication Data

US 2003/0063352 A1 Apr. 3, 2003

Related U.S. Application Data

(63) Continuation of application No. 09/997,068, filed on Nov. 29, 2001, now Pat. No. 6,519,067, which is a continuation of application No. 09/102,344, filed on Jun. 22, 1998, now Pat. No. 6,373,611.

(51) Int. Cl.[7] .......................... H04J 14/00; H04B 10/20; H04N 7/173
(52) U.S. Cl. .............................. 398/72; 398/58; 398/66; 398/67; 398/70; 398/71; 725/129; 725/127; 725/121; 725/119
(58) Field of Search .............................. 398/58, 66, 67, 398/70, 71, 72; 725/129, 119, 127, 121

(56) References Cited

U.S. PATENT DOCUMENTS

| | | | |
|---|---|---|---|
| 3,995,120 A | 11/1976 | Pachynski, Jr. ............... 179/15 |
| 4,759,018 A | 7/1988 | Buchner ...................... 370/112 |
| 4,763,317 A | 8/1988 | Lehman et al. ............... 370/58 |
| 5,018,142 A | 5/1991 | Simcoe et al. .............. 370/112 |
| 5,420,583 A | 5/1995 | Knecht ......................... 341/59 |
| 5,426,527 A | * 6/1995 | Steen et al. .................... 398/68 |
| 5,544,161 A | 8/1996 | Bigham et al. ............. 370/58.1 |
| 5,563,815 A | 10/1996 | Jones ......................... 364/721 |
| 5,644,622 A | 7/1997 | Russell et al. .............. 455/422 |
| 5,694,232 A | * 12/1997 | Parsay et al. ................. 398/42 |
| 5,790,523 A | 8/1998 | Ritchie, Jr. et al. ......... 370/241 |
| 5,790,533 A | 8/1998 | Burke et al. ................ 370/318 |
| 5,878,325 A | 3/1999 | Dail ........................... 455/5.1 |
| 5,966,636 A | 10/1999 | Corrigan et al. ............ 455/4.2 |
| 6,041,056 A | 3/2000 | Bigham et al. ............. 370/395 |
| 6,161,011 A | 12/2000 | Loveless ..................... 455/426 |
| 6,323,793 B1 | 11/2001 | Howald et al. ............. 341/137 |
| 6,519,067 B2 | * 2/2003 | Farhan et al. ................. 398/98 |
| 6,526,581 B1 | 2/2003 | Edson ......................... 725/74 |

FOREIGN PATENT DOCUMENTS

EP        0 318 331        5/1989

* cited by examiner

Primary Examiner—M. R. Sedighian

(57) ABSTRACT

A cable television system (100) having forward and reverse paths includes, in the reverse path, a digital optical transmitter (200) for receiving an RF signal, converting it to a digital signal, and adding a digital pilot tone thereto. A laser is driven in accordance with the summed digital signal to generate a digital optical signal representative of the pilot tone and the RF signal. The cable television system (100) also includes an optical receiver (305) for receiving the digital optical signal and recovering therefrom the RF signal and the pilot tone. The optical transmitter (200) and receiver (305) are coupled by fiber optic communication media (110).

9 Claims, 3 Drawing Sheets

400

DIGITAL OPTICAL TRANSMITTER

CROSS REFERENCE TO RELATED APPLICATIONS

The present application is a continuation of U.S. patent application Ser. No. 09/997,068, filed Nov. 29, 2001, now U.S. Pat. No. 6,519,067, currently pending, which is a con. of U.S. Pat. No. 6,373,611, Farhan et al., entitled Digital Optical Transmitter Ser No. 09/102,344 filed on Jun. 22, 1998.

FIELD OF THE INVENTION

This invention relates generally to fiber optic communications, and more specifically to optical transmitters for use in fiber optic communications.

BACKGROUND OF THE INVENTION

Cable television systems typically include a headend section for receiving satellite signals and demodulating the signals to baseband. The baseband signal is then converted to an optical signal for transmission from the headend section over fiber optic cable. Optical transmitters are distributed throughout the cable system for splitting and transmitting optical signals, and optical receivers are provided for receiving the optical signals and converting them to radio frequency (RF) signals that are further transmitted along branches of the system over coaxial cable rather than fiber optic cable. Taps are situated along the coaxial cable to tap off the cable signals to subscribers of the system.

Various factors influence the ability to accurately transmit and receive optical signals within a cable television system. As the length of fiber optic cable within a system increases, for example, signal losses also increase. Furthermore, temperature fluctuations, which cause variation in the optical modulation index of the optical transmitter, can result in variation of the radio frequency (RF) output level of the optical receiver. Signal distortions can be caused by non-linearities in the laser and photodiode of the optical transmitter.

Although these problems can be mitigated by employing expensive techniques, e.g., decreasing fiber lengths between optical nodes, such techniques may prohibitively increase costs to both subscribers and service providers. Thus, what is needed is a better way to provide reliable and accurate transmission of optical signals within a cable television system.

DETAILED DESCRIPTION OF A PREFERRED EMBODIMENT

Figure 1:
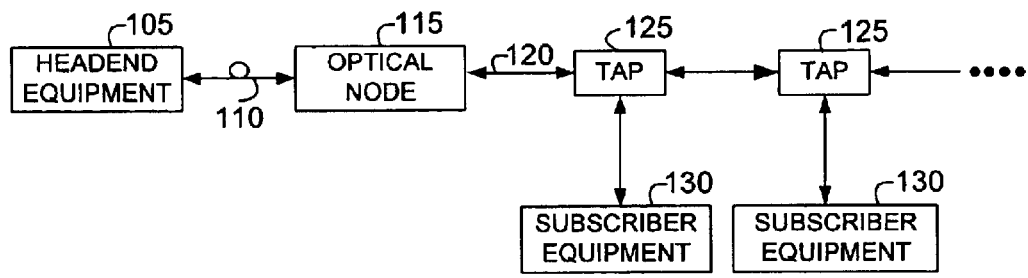
FIG. 1 is a block diagram of a cable television system in accordance with the present invention.

FIG. 1 shows a communications system, such as a cable television system 100 having both forward and reverse paths, i.e., having the ability to communicate downstream in the forward direction and upstream in the reverse direction. The cable television system 100 includes a headend 105 for receiving satellite signals that are demodulated to baseband or an intermediate frequency (IF). The baseband signal is then converted to cable television signals that are routed throughout the system 100 to subscriber equipment 130, such as set top decoders, televisions, or computers, located in the residences or offices of system subscribers. The headend 105 can, for instance, convert the baseband signal to an optical signal that is transmitted over fiber optic cable 110, in which case a remotely located optical node 115 converts the optical signal to an electrical radio frequency (RF) signal for further transmission through the system 100 over coaxial cable 120. Taps 125 located along the cable 120 at various points in the distribution system split off portions of the RF signal for routing to subscriber equipment 130 coupled to subscriber drops provided at the taps 125.

The system 100, as mentioned, also has reverse transmission capability so that signals, such as data, video, or voice signals, generated by the subscriber equipment 130 can be provided back to the headend 105 for processing. The reverse signals travel through the taps 125 and any nodes 115 and other cable television equipment, e.g., reverse amplifiers, to the headend 105. In the configuration shown in FIG. 1, RF signals generated by the subscriber equipment 130 travel to the node 115, which converts the combined RF signals to optical signals for transmission over the fiber optic cable 110 to the headend 105.

Figure 2:
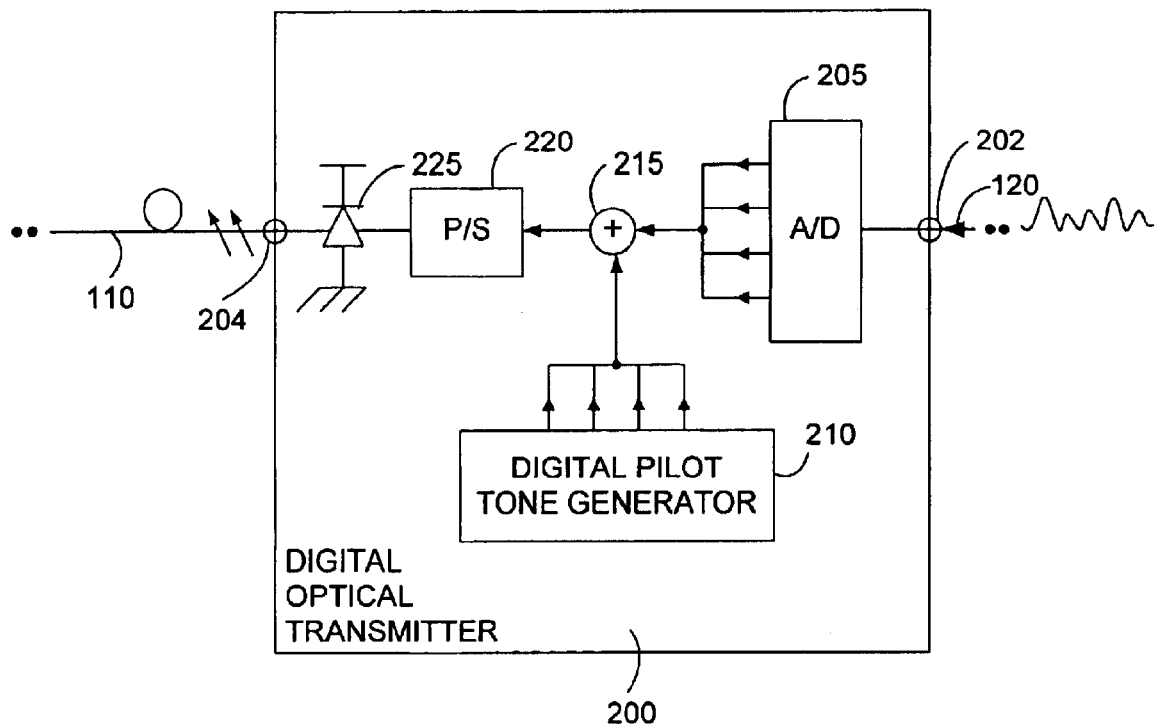
FIG. 2 is an electrical block diagram of an optical transmitter included in the cable television system of FIG. 1 in accordance with the present invention.

Referring to FIG. 2, a digital reverse transmitter 200 is provided for transmitting digital optical signals to the headend 105 in the reverse direction. The transmitter 200 can, for instance, be included within the optical node 115, although other locations within the cable television system 100 may also include the digital reverse transmitter 200 of the present invention. The transmitter 200 receives, at an input 202, a combined analog information signal that is representative of one or more reverse RF signals from the subscriber equipment 130. At its output 204, the transmitter 200 provides a digital optical signal that is generated in accordance with the analog information signal as well as an optional pilot tone that serves to provide a reference level during processing at the headend 105.

More specifically, the digital reverse transmitter 200 includes an analog-to-digital (A/D) converter 205 for converting the combined analog input to a digital signal, i.e., a digital word comprising a particular number of bits, in a conventional manner. The resolution of the A/D converter 205, of course, is dependent upon transmitter design parameters. The transmitter 200 can also include a digital pilot tone generator 210 for providing a digital pilot tone in the form of a number of bits representative of a particular level and frequency. The digital pilot tone generator 210 could, for instance, include input switches by which the level and frequency could be varied. U.S. Pat. No. 5,563,815 to Jones, the teachings of which are hereby incorporated by reference, shows a digital tone oscillator that could be used to implement the generator 210 included in the transmitter 200 of the present invention.

A summer 215 receives the digital information signal from the A/D converter 205 and the digital pilot tone signal from the generator 210 and digitally adds the two signals by performing binary addition in a known manner. The summed signal is then coupled to a parallel-to-serial (P/S) converter, or a serializer 220, which receives the parallel inputs representative of the summed signal and converts the inputs into a serial bit stream. A laser diode 225 is then driven to generate an optical signal in accordance with the serial bit stream. It will be appreciated that the serializer 220 can also include a driver for driving the laser diode 225 and frame encoding circuitry for encoding the serialized digital signal into frames of data.

Figure 3:
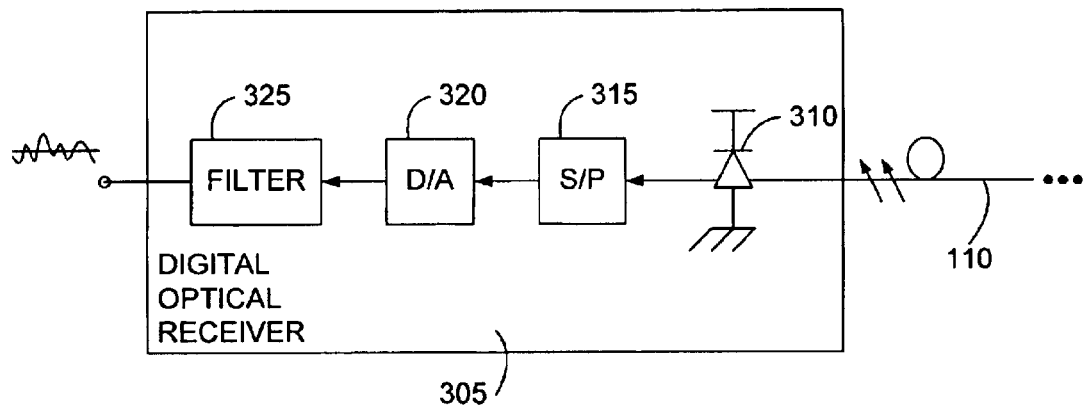
FIG. 3 is an electrical block diagram of an optical receiver included in the cable television system of FIG. 1 in accordance with the present invention.

FIG. 3 is a block diagram of an optical receiver 305 for receiving the digital optical signal transmitted by the optical transmitter 200. The receiver 305 can be, for instance, located in the headend 105, although other locations, such as any intervening nodes, may also employ the receiver 305. The receiver 305 includes a detector, such as a photodiode 310, for receiving the digital optical signal transmitted over the fiber optic cable 110 and generating therefrom a serial stream of electrical pulses in accordance with the optical signal. The output signals provided by the photodiode 310 are coupled to a serial-to-parallel (P/S) converter 315 for generating therefrom a set of parallel outputs corresponding to a digital word. The receiver 305 further includes a digital-to-analog (D/A) converter 320 for converting the signal provided at its digital input to an analog signal in a known manner. Thereafter, the analog signal is processed by a filter 325 to separate the pilot tone signal from the information signal. More specifically, the filter 325 preferably comprises a low pass filter that only passes the fundamental frequency component of the output of the D/A converter 320. As a result, the digital optical receiver 305 is able to provide at its output a reference signal, i.e., the pilot tone, and an analog signal that approximates the analog information signal initially provided to the optical transmitter 200. Furthermore, this can be done without encountering many of the problems that arise in prior art designs.

In conventional cable television systems, optical links in the reverse path use amplitude modulation to directly modulate a laser generating a reverse optical signal. As a result, RF output level of the optical receiver is directly dependent upon the optical modulation index (OMI), which in turn is directly related to the RF drive current, the laser threshold current, and the laser bias current of the laser located in the transmitter. Since the laser bias and threshold currents vary with temperature, which in turn causes temperature variations of the OMI, the RF output level of the optical receiver also varies with temperature. However, the laser within the transmitter 200 of the present invention is digitally modulated so that the RF level information is encoded according to a bit stream; as a result, variations in the OMI, the laser bias current, the laser threshold current, and the temperature do not affect RF output levels of the optical receiver 305.

Prior art optical transmission that use AM modulation also result in a system in which the linearity of the received optical signal is directly dependent upon the linearity of the transmitting laser and the receiving photodiode. Therefore, non-linearities of those devices can greatly degrade the performance of the reverse path system. Additionally, the non-linear conversion processes of lasers and photodiodes in conventional systems vary with temperature, thus further degrading the performance. Conversely, the digital optical system, i.e., the digital optical transmitter 200 and the digital optical receiver 305, of the present invention only generates and resolves two amplitude levels rather than a continuum of levels. As a result, linearity requirements of the laser and photodiode are reduced, which results in better performance and less expense.

Another problem associated with conventional cable television systems is that reverse pilot tones are seldom used due to the complications and costs. When such pilot tones are used, an additional oscillator, which is not digital, is generally located outside the transmitter and is susceptible to temperature variations. The oscillator signal is combined with the analog RF signal, and the combined signal is used to modulate the laser diode current to provide an optical output. Prior art pilot tones are used by an optical transmitter to ensure that there is always a minimum RF signal modulating the laser, thereby decreasing the spurious noise generated by the laser, and by an optical receiver for gain control purposes. However, since oscillator output level drifts with temperature, the RF output level of the optical receiver will also drift with temperature so that gain control is essentially useless. As mentioned above, use of the combined digital pilot tone and digital information signal according to the present invention solves the prior art temperature dependency problems. At the same time, the digital pilot tone can be used by the transmitter 200 to modulate the laser even when no RF input is present.

Still another advantage of the digital optical transmitter 200 and receiver 305 of the present invention is that the cable system 100 can, without significant cost or performance penalties, employ an architecture in which fiber stretches deeper into the system 100. As a cable television signal travels along a fiber optic cable 110, the signal decreases in power as a result of laser noise, Rayleigh backscattering, photodiode shot noise, receiver amplifier noise, unmodulated Fabry-Perot sporadic noise, and post amplifier intrinsic noise. These factors cause the carrier-to-noise ratio (CNR) to decrease. Conventionally, this problem is mitigated by driving the transmitter laser with more power and/or increasing the receive sensitivity of the receiver photodiode at great expense. However, this need not be done in a system 100 according to the present invention since the noise sources and corresponding signal degradation resulting from increased fiber lengths does not affect recovery of information to the same extent as in prior art systems.

Figure 4:
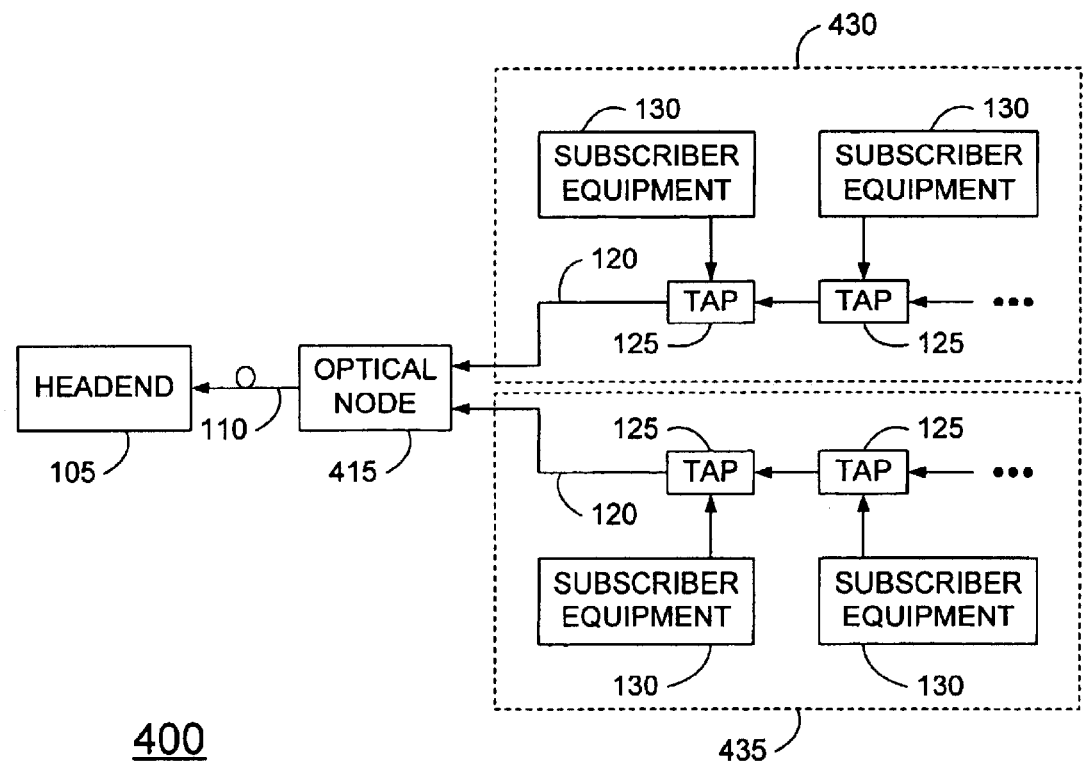
FIG. 4 is a block diagram of a cable television having multiple outputs to subscriber regions in accordance with the present invention.

Referring next to FIG. 4, a modified cable television system 400 is depicted. The system 400 includes a headend 105 for generating cable television signals that are split off to subscriber equipment 130 by taps 125. However, in the system 400, the optical node 415 splits off the downstream cable signal for transmission to multiple distribution systems 430, 435, or branches. Each branch typically provides service to subscribers located in different geographic regions. Upstream reverse signals provided by subscriber equipment 130 in the different branches 430, 435 is transmitted in the form of combined analog RF signals to the optical node 415, which further combines the signals for further upstream transmission in the form of an optical signal. According to the present invention, the combined upstream signals from the different branches 430, 435 can be converted to a digital optical signal in a manner that minimizes or eliminates many of the problems associated with prior art cable television systems.

Figure 5:
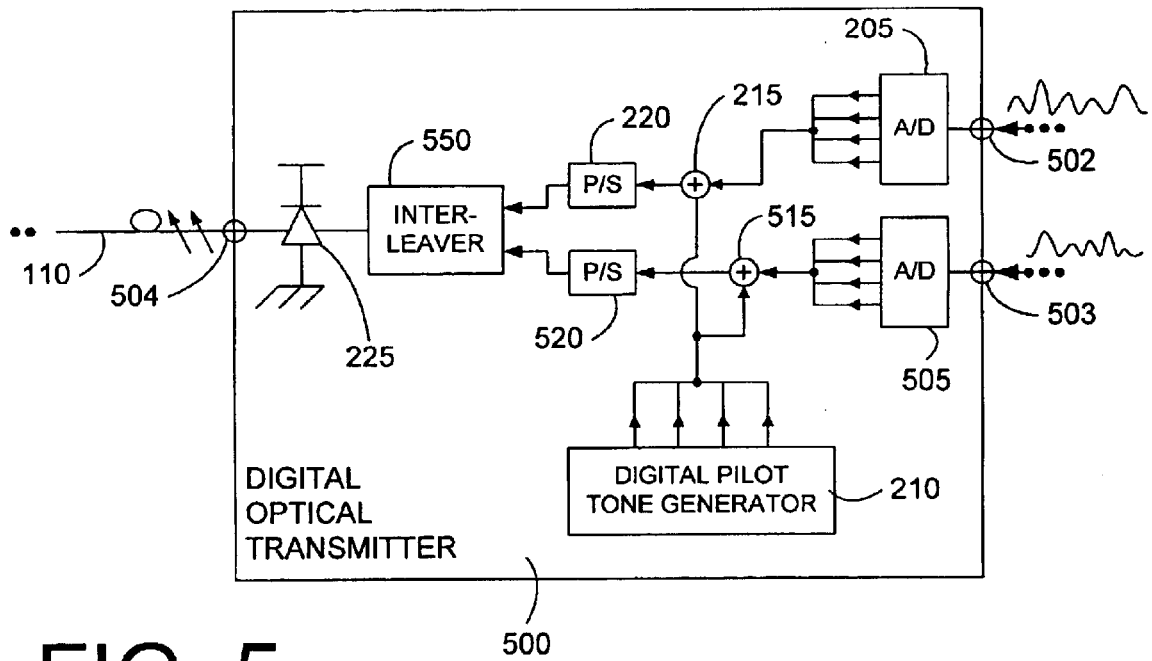
FIG. 5 is an electrical block diagram of an optical transmitter included in the cable television system of FIG. 4 in accordance with the present invention.

FIG. 5 is an electrical block diagram of an optical transmitter 500 that can, in accordance with the present invention, be used to process multiple analog inputs. At input 502, the transmitter 500 receives a first combined analog input, such as from a first branch 430 of a cable television system 400, and, at input 503, the transmitter 500 receives a second combined analog input, such as from a second branch 435 of the system 400. First and second A/D converters 205, 505 respectively convert the received RF signals to digital information signals that are separately summed, by summers 215, 515, with the digital pilot tone. Each summed signal is then serialized by serializers 220, 520 to result in first and second serial bit streams that are representative of the first and second RF signals, respectively, as separately combined with the digital pilot tone. According to the present invention, bits of the serial bit streams are interleaved by an interleaver 550 to form a single digital signal that modulates the laser diode 225. As a result, a single digital optical signal can be provided at the output 504 of the transmitter 500.

Figure 6:
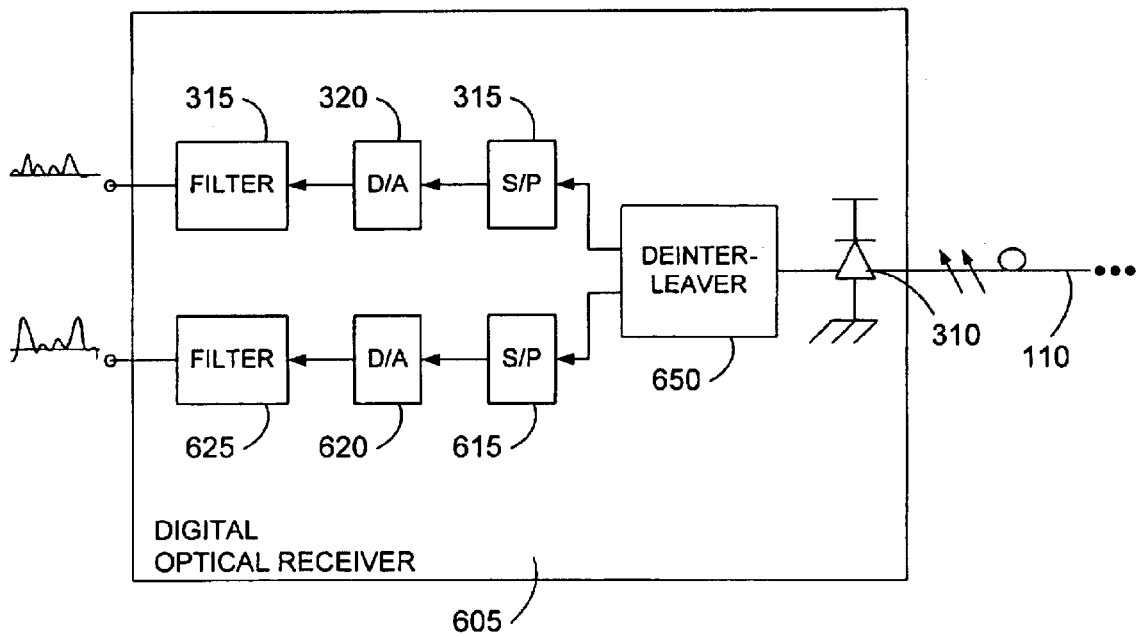
FIG. 6 is an electrical block diagram of an optical receiver included in the cable television system of FIG. 4 in accordance with the present invention.

Referring to FIG. 6, an optical receiver 605 for processing the digital optical signal generated by the transmitter 500 is shown. The receiver 605 includes a photodiode 310 for generating electrical pulses from the optical signal and a deinterleaver 650 for deinterleaving the signal comprising the electrical pulses. Once the deinterleaver 650 has separated the received signal into separate serial bit streams, the outputs are coupled to first and second S/P converters 315, 615, first and second D/A converters 320, 620, and first and second filters 325, 625 to recover approximations of the pilot tone and the RF signals that were provided to the transmitter 500.

It will be appreciated that the interleaver 550 and the deinterleaver 650 can be implemented using conventional components. Typically, the interleaver 550 could be a framing device capable of implementing a time-domain-multiplexing (TDM) scheme with respect to the incoming bit streams. In such an implementation, a frame clock (not shown) would be coupled to the interleaver 550, and one frame would consist of a number of sub-frames equivalent to the number of incoming bit streams. A flag bit would likely be inserted into the frame for identifying the start of the frame. The deinterleaver 650 is capable of extracting the frame clock signal from the incoming information and recognizing the flag bits indicative of frame starts. Each bit would then be routed to its respective bit stream to recover the original signals.

Although only two input branches into the transmitter 500 and two processing paths through the transmitter 500 and the receiver 605 are shown, a plurality of paths can be provided depending upon the number of incoming analog signals to be processed by the transmitter 500. For example, if five RF signals are traveling in the reverse paths of five branches of a cable television system, the optical transmission system according to the present invention would individually convert each reverse signal to a digital signal, add it to the pilot tone, and serialize the combined signal. All serialized signals would then be combined by the interleaver 550 to generate a bit stream for modulating the laser diode 225 (FIG. 5). On the receiver end, the deinterleaver 650 would deinterleave the received digital optical signal to provide five serial signals that would be individually processed by S/P converters, D/A converters, and filters to provide five analog outputs as well as an approximation of the pilot tone.

In this manner, reverse signals of the same frequency can be conveniently sent to the headend 105 over the same return fiber 110. This is very important since cable television systems typically only allocate a small amount of bandwidth, e.g., 5–40 MHZ, for return path transmissions, which means that varying the frequency of each return path signal would not be practical.

In summary, the reverse digital transmission system described above provides one or more reverse signals without many of the problems present in prior art systems. As a result, information can be sent from subscribers to the headend in a more reliable and less expensive manner.

What is claimed is:

1. In a cable television (CATV) system having a headend that provides video and data to a plurality of subscriber equipment via hybrid fiber/coax (HFC) network that includes a fiber portion, a first coax portion, a second coax portion, and a node for connecting the fiber portion to the first and second coax portions, a reverse path optical transmitter for use in the node, said reverse path transmitter comprising:

a first input port for receiving a first plurality of reverse RF signals from a first portion of said plurality of subscriber equipment in said first coax portion, said first plurality of reverse RF signals together forming a first combined reverse RF signal;

a first analog-to-digital converter for converting said first combined reverse RF signal into a first reverse parallel digital signal;

a first parallel-to-serial converter for converting said first reverse parallel digital signal into a first reverse serial digital signal;

a second input port for receiving a second plurality of reverse RF signals from a second portion of said plurality of subscriber equipment in said second coax portion, said second plurality of reverse RF signals together forming a second combined reverse RF signal;

a second analog-to-digital converter for converting said second combined reverse RF signal into a second reverse parallel digital signal;

a second parallel-to-serial converter for converting said second reverse parallel digital signal into a second reverse serial digital signal;

an interleaver for interleaving said first and second reverse serial digital signals to form a combined reverse digital signal;

a laser diode for converting said combined reverse serial digital signal into a reverse digital optical signal; and an output for transmitting said reverse digital optical signal to said headend over said fiber portion of said HFC network.

2. The CATV system of claim 1, wherein the reverse RF signals comprise data, video, or voice signals.

3. The CATV system of claim 1, wherein the subscriber equipment comprises cable television set-top decoders.

4. The CATV system of claim 1, wherein the first and second parallel-to-serial converters include frame encoding circuitry for framing said first and second reverse serial digital signals.

5. In a cable television (CATV) system having a headend that provides video and data to a plurality of subscriber equipment via a hybrid fiber/coax (HFC) network that includes a fiber portion, at least two coax portions, and a node for connecting the fiber portion to the at least two coax portions, a reverse path optical transmitter for use in the node, said reverse path transmitter comprising:

for each of said at least two coax portions of said HFC network, a single input for receiving from said corresponding coax portion of said HFC network a plurality of reverse RF signals from a portion of said plurality of subscriber equipment in said corresponding coax portion, said plurality of reverse RF signals together forming a combined reverse RF signal;

a single analog-to-digital converter for converting said corresponding combined reverse RF signal into a corresponding reverse parallel digital signal;

a single parallel-to-serial converter for converting said corresponding reverse parallel digital signal into a corresponding reverse serial digital signal;

an interleaver for interleaving said reverse serial digital signals from said at least two coax portions to form a combined reverse digital signal;

a laser diode for converting said combined reverse serial digital signal into a reverse digital optical signal; and an output for transmitting said reverse digital optical signal to said headend over said fiber portion of said HFC network.

6. The CATV system of claim 5, wherein the subscriber equipment comprises cable television set-top decoders.

7. The CATV system of claim 5, wherein the reverse RF signals comprise data, video, or voice signals.

8. The CATV system of claim 5, wherein the parallel-to-serial converters include frame encoding circuitry for framing said reverse serial digital signals.

9. A method for providing a reverse digital optical signal in a cable television (CATV) system having a headend that provides video and data to a plurality of subscriber equipment via a hybrid fiber/coax (HFC) network that includes a fiber portion, at least two coax portions, and a node for connecting the fiber portion to the at least two coax portions, said method comprising the steps of:

for each of said at least two coax portions of said HFC network, receiving from said corresponding coax portion of said HFC network a plurality of reverse RF signals from said plurality of subscriber equipment in said corresponding coax portion, said plurality of reverse RF signals together forming a combined reverse RF signal;

converting said corresponding combined reverse RF signal into a corresponding reverse parallel digital signal;

converting said corresponding reverse parallel digital signal into a corresponding reverse serial digital signal;

interleaving said reverse serial digital signals from said at least two coax portions to form a combined reverse digital signal;

converting said combined reverse serial digital signal into a reverse digital optical signal; and transmitting said reverse digital optical signal to said headend over said fiber portion of said HFC network.

* * * * *